United States Patent [19]

Bergman

[11] 4,112,864
[45] Sep. 12, 1978

[54] HEAVE STABILIZATION OF SEMI-SUBMERSIBLE PLATFORMS

[75] Inventor: Gunnar B. Bergman, Montecito, Calif.

[73] Assignee: Seatek Corporation, Santa Barbara, Calif.

[21] Appl. No.: 731,007

[22] Filed: Oct. 8, 1976

[51] Int. Cl.² .............................................. B63B 21/52
[52] U.S. Cl. .......................................... 114/265; 9/8 P
[58] Field of Search ............... 114/264, 265, 266, 267, 114/256, 257, 258, 260, 56, 61, 121–125; 9/8 R, 8 P; 61/46.5

[56] References Cited

U.S. PATENT DOCUMENTS

| | | | |
|---|---|---|---|
| 1,643,464 | 9/1927 | McCullers | 114/263 |
| 1,705,303 | 3/1929 | Nagy | 114/123 |
| 3,078,680 | 2/1963 | Wepsala | 114/265 |
| 3,187,355 | 6/1965 | Wassenaar | 9/8 P |
| 3,649,978 | 3/1972 | Monnereau | 9/8 P |
| 3,824,943 | 7/1974 | Mo | 114/264 |
| 3,874,314 | 4/1975 | Sanders | 114/265 |
| 3,894,503 | 7/1975 | McClure | 114/265 |
| 3,917,022 | 11/1975 | Brooks | 114/61 |
| 3,978,805 | 9/1976 | Thomas | 9/8 P |

Primary Examiner—Trygve M. Blix
Assistant Examiner—D. W. Keen
Attorney, Agent, or Firm—A. C. Smith

[57] ABSTRACT

Semi-submersible offshore drilling platforms are stabilized to reduce heave at wave periods which are shorter than those at which heave resonance occurs. Platform structures include supporting columns and pontoons. The pontoons extend outboard of the columns and have non-uniform cross sections. In addition, the pontoons may be shifted outwardly from the column center-lines. Reduced heave response to head-on, stern-on and beam waves is achieved.

2 Claims, 10 Drawing Figures

HEAVE STABILIZATION OF SEMI-SUBMERSIBLE PLATFORMS

BACKGROUND OF THE INVENTION

The present invention relates generally to semi-submersible structures, and more particularly to the stabilization of such structures in heavy seas.

Semi-submersible platforms are required in various types of offshore operations, including scientific surveys, and oil and gas drilling and production. A platform typically comprises an elevated deck supported by a number of vertical columns which are often connected near the lower ends by horizontally extending pontoons. The platform floats with the lower portions of the vertical columns and the pontoons submerged and the deck above the water surface.

In use, a stable platform is desired. However, wave motion produces substantial undesirable platform displacement. In heavy seas, it is particularly desirable to reduce heave in order to achieve platform stability, heave being the vertical linear displacement of the platform which occurs in response to wave motion.

Improvements for stabilizing semi-submersible platforms are disclosed in copending U.S. patent application Ser. No. 649,997 filed Jan. 19, 1976, by Gunnar B. Bergman and assigned to the same assignee as the present invention. Said improvements operate to apply controlled damping forces to a platform, thereby to counteract the forces of wave motion which cause oscillatory platform displacement.

It is an object of the present invention to improve stabilization of semi-submersible platforms by providing pontoon configurations which act to reduce heave.

SUMMARY OF THE INVENTION

In accordance with one illustrated embodiment of the present invention, a semi-submersible structure includes platform supporting columns and pontoons disposed inboard between columns near the lower ends thereof as well as longitudinally outboard of the columns. The pontoons have non-uniform cross sections such that the outboard portions thereof together have greater displacement volumes than the inboard portions. Pontoon configuration and displacement are such that wave forces acting thereon are effectively reduced. Platform heave in response to head-on or stern-on waves is substantially reduced in particular for wave periods shorter than the period at which platform resonance occurs.

Other illustrated embodiments of the present invention provide pontoons having effective centers of dynamic pontoon force shifted outwardly of the centers of the supporting columns in either a transverse or diagonal manner. Such configurations reduce non-resonant platform heave caused by beam waves in the transverse case and by waves in all directions in the diagonal case.

DESCRIPTION OF THE PREFERRED EMBODIMENTS

Figure 1:
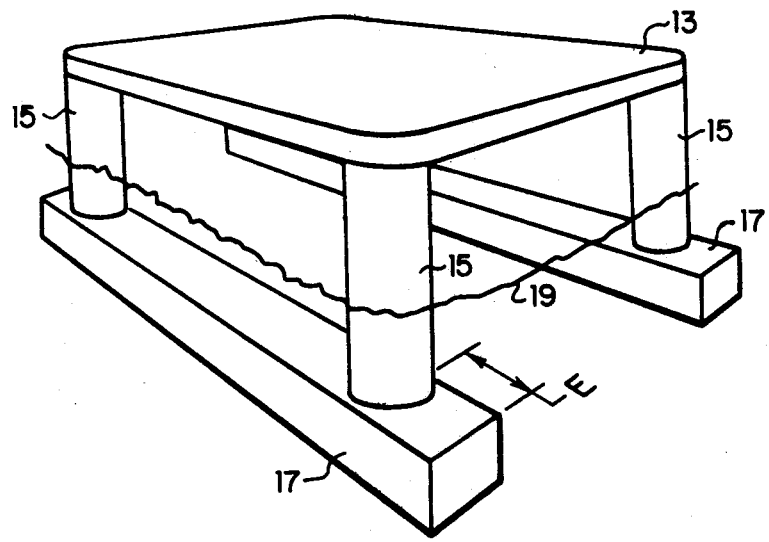
FIG. 1 is a perspective view of a conventional semi-submersible platform of the type presently used in offshore oil drilling operations.

Referring now to FIG. 1, there is shown a semi-submersible structure of the type presently used for offshore oil drilling operations. A deck 13 is supported by four columns 15, which are connected by two pontoons 17. Although only four columns are shown, additional columns may be interposed between columns 15 along each pontoon. As shown, portions of columns 15, and the pontoons 17 are submerged below the water surface 19. Typically deck 13 is 200 feet square, each of the columns 15 has a cross-sectional area of about 800 square feet, and each pontoon 17 has a cross-sectional area of about 800 square feet. Pontoons 17 extend beyond the columns a distance E that is typically less than about 40 feet. Operational draft of the platform is 50 to 70 feet.

In the presence of disturbing waves, oscillatory forces act on the columns and pontoons to cause the platform to be displaced vertically. Such displacement is called heave. Heave amplitude is a function of wave period, i.e. the time between wave crests as measured from a stationary point.

Figure 2:
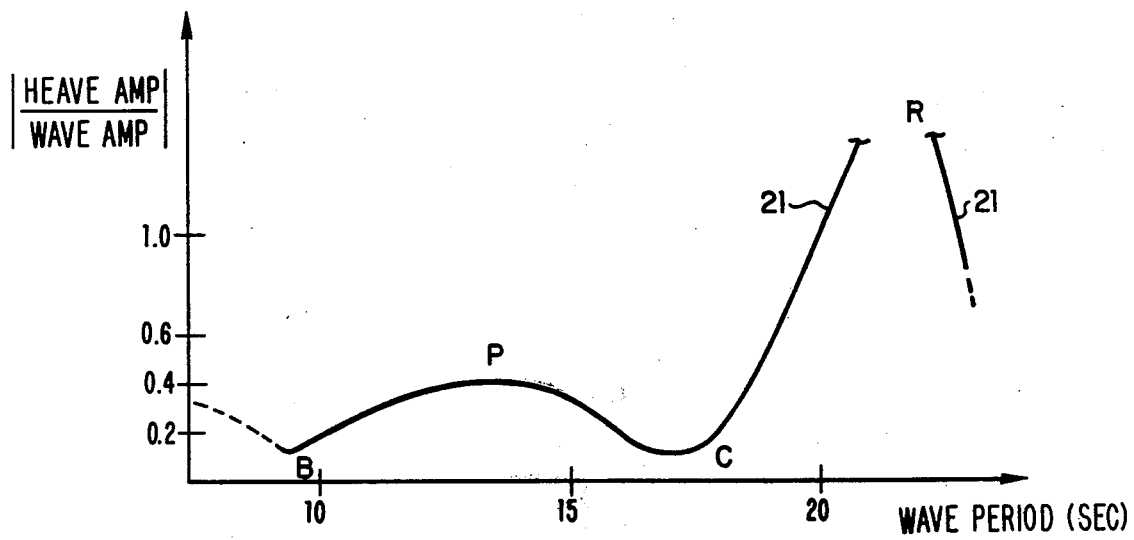
FIG. 2 is a graph illustrating heave response of a semi-submersible platform as a function of wave period.

FIG. 2 illustrates a typical heave response curve 21 for the platform of FIG. 1. The curve is approximately the same for beam and head-on waves. The vertical axis represents the ratio of heave amplitude to wave amplitude measured at a given wave amplitude (such as 15 feet), while the horizontal axis represents wave period $t$ in seconds. Thus for a given wave period, the heave amplitude is equal to the corresponding value on curve 21 multiplied by the wave amplitude.

It can be shown that curve 21 may be considered the resultant of two principal components. The first component is the response to the oscillatory forces exerted by the waves on the bottoms of the columns. The second component is the response to the oscillatory forces acting on the pontoons. For certain wave periods, the column force is upward, while the pontoon force is downward, as explained below. The resultant of the responses to these forces, when corrected for the drag effects of platform geometry, is shown as curve 21. The characteristics of curve 21 are described in more detail hereinafter.

Figure 3:
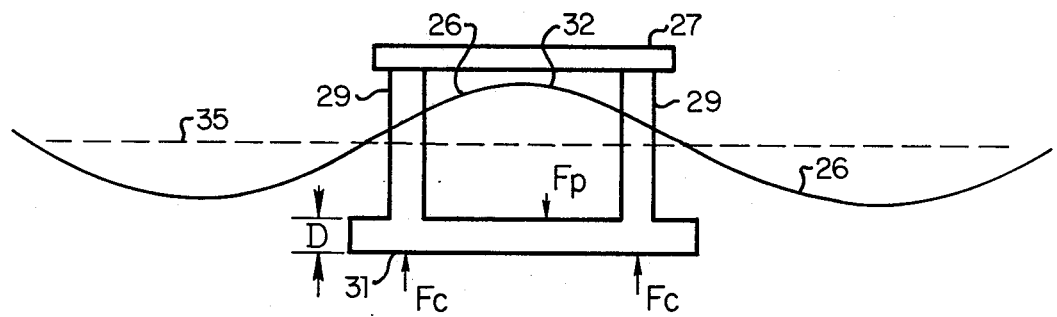
FIG. 3 is a diagrammatic representation of the forces exerted by waves on a pontoon and on the columns of a semi-submersible platform.

Upward forces on columns 15 result from the pressure oscillations due to wave motion acting on the bottoms of the columns. These forces are counteracted by the downward forces on pontoons 17. FIG. 3 illustrates the manner in which such downward forces are produced by wave motion. A side view of a semi-submersible platform is diagrammatically represented in the presence of large waves 26. The platform includes a deck 27, columns 29 and pontoons 31. As a wave crest 32 passes, the dynamic pressure created by the wave decreases with depth. For a pontoon of a given vertical dimension D there will be a dynamic pressure differential $F_p$ acting downwardly on the top of the pontoon. This force is opposite to the upward forces $F_c$ on columns 29, and forces $F_c$ and $F_p$ together produce resultant curve 21 of FIG. 2.

Curve 21 indicates that platform heave varies substantially as a function of wave period. In particular, maximum heave occurs at platform resonance designated by region R. In the resonance region, upward forces acting on the column bottoms dominate. Minimum heave occurs at points B and C. At point C the upward column forces and downward pontoon forces tend to cancel, although the net force is not zero because of the presence of small platform drag forces. At point B the column and pontoon forces tend toward zero and also cancel. A smaller heave maximum occurs at region P, where the downward forces acting on the pontoons dominate.

At resonant wave periods (e.g., 20–21 seconds) heave can be reduced by the controlled application of damping forces to the platform, as described in the aforementioned U.S. patent application Ser. No. 649,997. Even with controlled damping, at non-resonant wave periods (e.g., 10–15 seconds), the hump on curve 21 with the maximum at P is often responsible for excessive heave of semi-submersible platforms.

Figure 4:
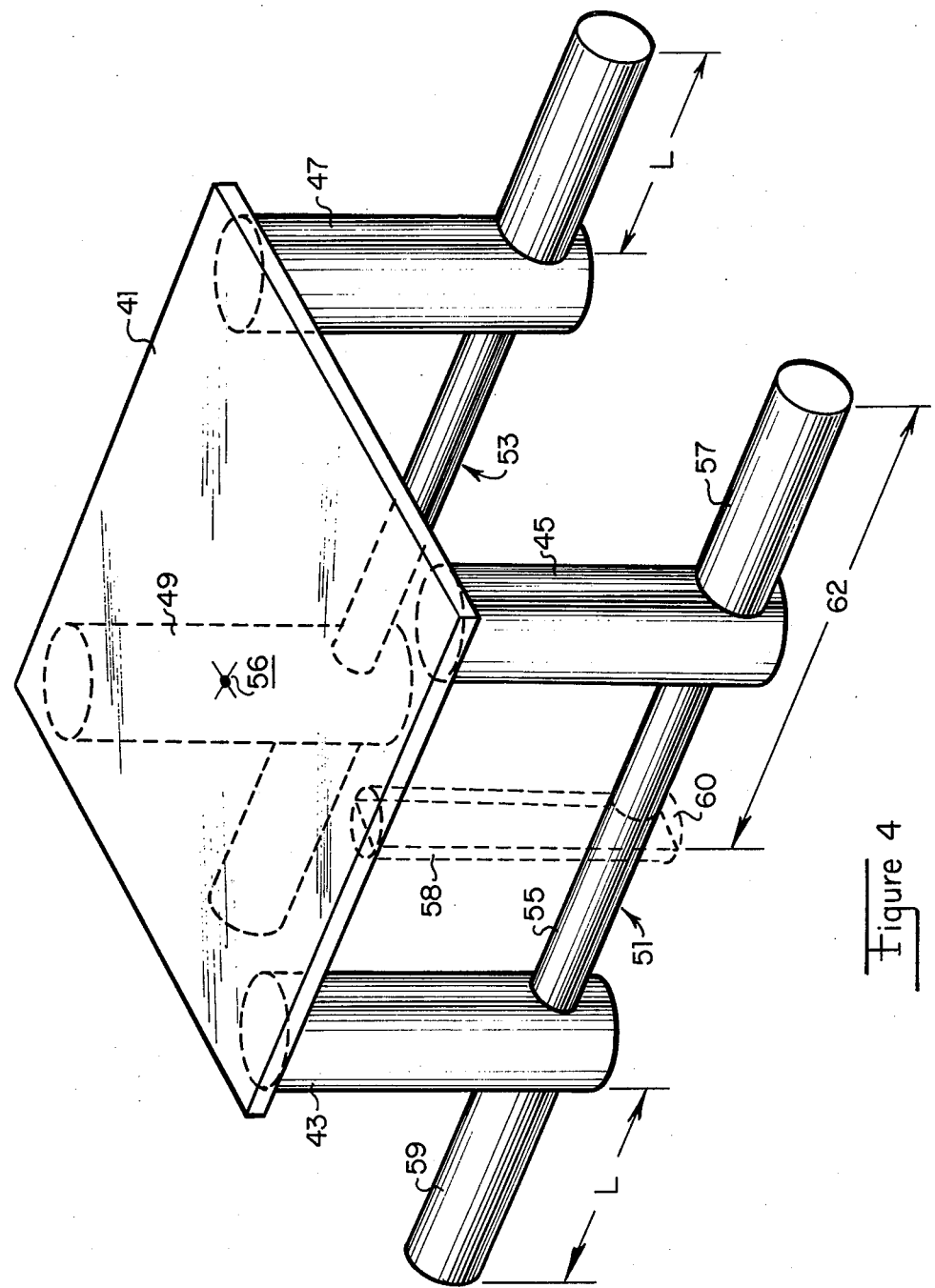
FIG. 4 is a perspective view of one embodiment of a semi-submersible platform constructed according to principles of the present invention.

FIG. 4 illustrates a semi-submersible platform configuration of the present invention which substantially reduces heave response in the region P of curve 21 in FIG. 2. There is shown a deck 41 supported by four columns 43, 45, 47, 49. Additional columns may be interposed between these columns along each pontoon. The lower ends of columns 43 and 45 are interconnected by pontoon 51, and the lower ends of columns 47, 49 are interconnected by pontoon 53. The pontoons 51, 53 have upper horizontal surface projections which are submerged below the water line. Each of the pontoons 51, 53 has a non-uniform cross section over the length thereof. In particular, pontoon 51, for example, has a portion 55 inboard of columns 43, 45 and portions 57, 59 extending longitudinally outboard of these columns a distance L. Inboard portion 55 has a smaller cross section, and thus a smaller displacement volume per unit length, than the two outboard portions 57, 59.

It has been found that for a column diameter of 40 feet, effective reduction of platform heave in the region P on the curve of FIG. 2 occurs when the inboard portion 55 of the pontoon is 26 feet in diameter, the outboard extensions 57, 59 are each 34 feet in diameter, and the centers of the columns 43, 45 are located about ¼ of the length of the pontoon 51 in from the ends thereof. The inboard and outboard portions of pontoon 53 are similarly configured.

The length L by which the outboard portions of pontoons 51, 53 extend from the columns is preferably about 80 feet for a platform having the aforementioned column diameters and a column to column distance of 200 feet measured center to center rectilinearly. It has been found that the total length of each pontoon should be of the order of 400 feet or less to avoid total cancellation of pontoon forces over a wave length and consequent undesirable predominance of column forces which might contribute to platform instability. Thus, the columns 43, 45, for example, are attached to pontoon 51 at substantially the one-quarter and three-quarter points along the length of the pontoon.

It should be understood that the pontoons may have other shapes and dimensions than those described above. In general, a platform structure has a reference point about which sectors of the structure are disposed. Within each sector, a portion of the length of a pontoon is allocatable to all columns attached to the pontoon in that sector. In accordance with the present invention, the pontoon design should be such that in long waves e.g. 20 seconds period the effective center of dynamic force acting on the allocated portion of a pontoon within a sector shall be outboard of the center of gravity of the column displacement associated with the pontoons in that sector. This may be done by lengthening or increasing the diameter of the outboard portions of the pontoons.

With reference to FIG. 4, it can be seen that the reference point for the platform is designated by point 56 and the sectors correspond to the four quadrants of the surface of deck 41. The center of gravity of column 45 is at its longitudinal axis and the center of effective dynamic pontoon force of the allocatable portion 62 of the pontoon associated with column 45 in the same sector is disposed outboard of the center of gravity of column 45 in a direction along the longitudinal axis of the pontoon. If an additional column 58 is interposed between columns 43, 45 (and also between columns 47, 49 although not visible) the longitudinal one-half portion 60 of column 58 is allocatable to the one-half portion 62 of the associated pontoon. In this configuration the center of gravity of column 45 and the one-half portion 60 of column 58 is intermediate the two columns 45, 58 along the associated pontoon. The center of effective dynamic pontoon force of portion 62 of the pontoon is also disposed outboard of the center of gravity.

Figure 5:
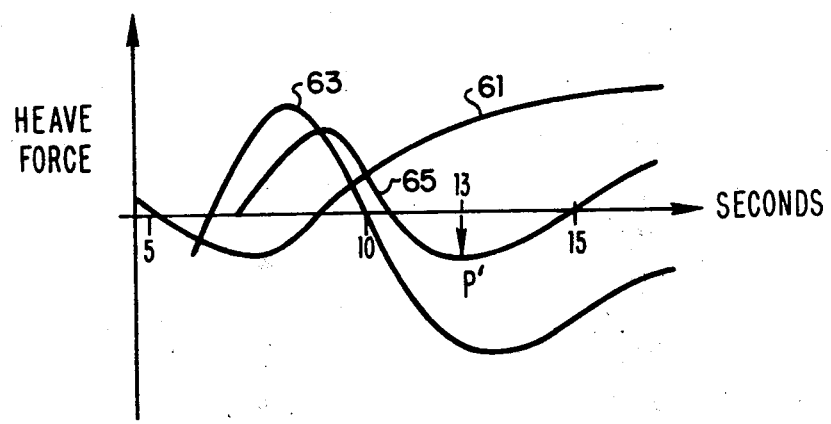
FIG. 5 is a graph illustrating heave forces on the platform of FIG. 4.

The graph of FIG. 5 illustrates heave force as a function of wave period for the semi-submersible platform of FIG. 4. The curves shown neglect the effects of small drag forces acting on the platform. Curve 61 represents wave force acting in the aggregate on the platform columns, while curve 63 represents aggregate force on the pontoons. The resultant of these two curves is shown as curve 65.

It can be seen that curve 65 has a negative hump (indicating net downward force on the pontoons) having a maximum point P' at a wave period of about 13 seconds. This is the wave period at which maximum downward force occurs for the platform configuration of FIG. 4. As can be understood by reference to FIG. 3, the different parts of the pontoons contribute unequally to the total dynamic pontoon force when analyzed with respect to a wave crest appearing at the center of the platform. In particular, the inboard portions contribute more dynamic force per unit volume because they are at the wave crest. The outboard portions contribute less dynamic force per unit volume because they are located near the wave troughs. The force contribution of the portion of the pontoon at a distance of ¼ wavelength from the wave crest is zero. With the pontoon configuration shown in FIG. 4, pontoon displacement inboard of the columns is less than the pontoon displacement outboard of the columns. Thus, in the presence of a wave, the inboard portions of the pontoons contribute a smaller portion of the total dynamic pontoon force than if the pontoons were of uniform cross section over the entire lengths thereof. In addition, the pontoon length and configuration cause wave forces acting on the different portions thereof to be out of phase. Consequently, in the presence of a wave crest, total dynamic pontoon force is diminished, thereby reducing heave in the region P'.

Figure 6:
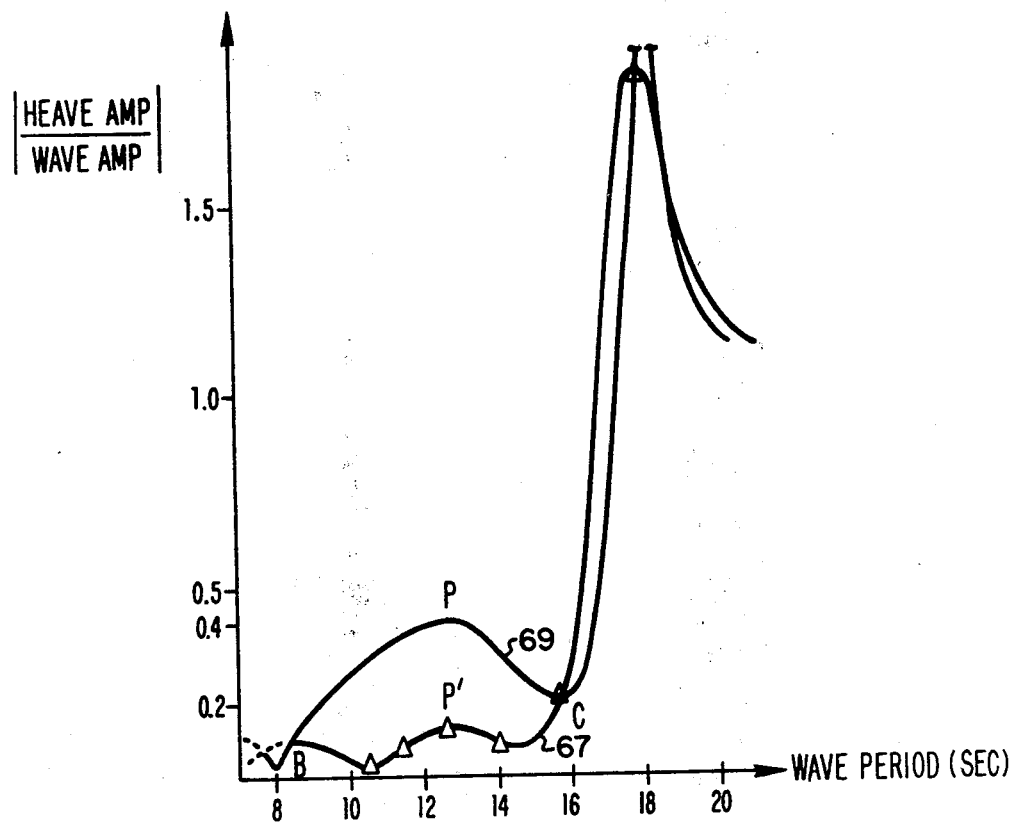
FIG. 6 is a graph illustrating reduced heave response of a semi-submersible platform embodying the present invention compared with the heave response of a conventional platform.

FIG. 6 illustrates a heave response curve 67 for a semi-submersible platform embodying the present invention, as shown in FIG. 4, compared with a response curve 69 for a conventional semi-submersible platform of the type shown in FIG. 1. The comparison illustrates the substantial improvement in heave response for short wave periods in the range of 9–15 seconds. In this range, externally-generated damping forces can be less efficiently applied than at resonance (i.e. at an 18-second wave period) in the manner described in the aforementioned U.S. patent application Ser. No. 649,997. For the conventional semi-submersible platform of FIG. 1, heave response for a 13-second wave period is 0.4. Thus, vertical platform displacement due to thirty-foot waves would be twelve feet (0.4 × 30 feet = 12 feet). This is an intolerably large displacement which would prohibit use of the platform in oil drilling operations. In contrast, the heave response is less than 0.2 for a platform embodying the present invention, as shown in FIG. 4. Thus, the vertical displacement is less than six feet for thirty-foot waves of the same wave period. This displacement is within an acceptable range for offshore drilling operations.

The heave response curve 67 is achieved with the platform of FIG. 4 in the presence of head-on and stern-on waves. Heave response for quartering waves was found to be slightly greater, although still substantially less than that for a platform of conventional design.

Figure 7:
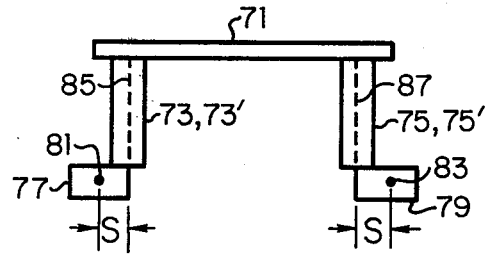
FIGS. 7 and 8 are diagrammatic views of other embodiments of semi-submersible platforms constructed according to principles of the present invention.

Further improvement in platform heave response to beam waves may be achieved by shifting the pontoons laterally outwardly, so that the longitudinal center-lines of the pontoons are disposed outwardly of the column centers, as shown in the end view of a platform in FIG. 7. Deck 71 is supported by a pair of columns 73, 73' along one side attached to pontoon 77 and by a pair of columns 75, 75' along the other side attached to pontoon 79. With reference to FIGS. 4 and 7, columns 73, 75 correspond to columns 45, 47, respectively, columns 73', 75' correspond to columns 43, 49, respectively, and pontoons 77, 79 correspond to pontoons 51, 53, respectively.

As shown in FIG. 7, the longitudinal center-line 81 of pontoon 77 is shifted laterally outwardly of the center-line 85 of column 73. Similarly, center-line 83 of pontoon 79 is shifted outwardly of center-line 87 of column 75. Thus, the effective center of dynamic force (and for axially symmetrical pontoons, the effective center of displacement volume) of each pontoon is located outboard of the center of its associated column. The offset distance S between each pontoon center-line and the corresponding column center is preferably about twelve to fifteen feet for the column and pontoon dimensions given above with respect to FIG. 4. Pontoons offset in this manner according to the present invention produce dynamic forces which are more out of phase with respect to a reference in the center of the platform and with respect to each other than with the configuration of FIG. 4. This reduces the total dynamic pontoon force in the presence of beam waves.

Figure 8:
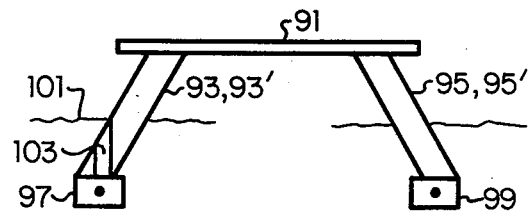

FIG. 8 illustrates an end view of another platform according to the present invention which embodies laterally shifted pontoons for achieving improved heave reponse in the presence of beam waves. Deck 91 is supported by pairs of columns 93, 93' and 95, 95' which are tilted outwardly a sufficient distance to achieve the same results as provided by offset distance S described above. Pontoons 97, 99 are attached to the pairs of columns 93, 93' and 95, 95', respectively. The portion of each column below the water line 101 acts as a pontoon, because it has entirely submerged upper and lower surfaces subject to dynamic wave forces. This is illustrated by the exemplary increment of column volume represented by segment 103.

Figure 9A:
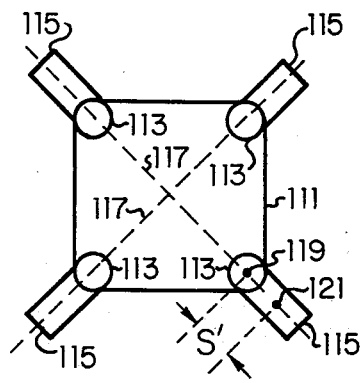
FIGS. 9a and b are plan and side views, respectively, of another embodiment of a semi-submersible platform constructed according to principles of the present invention.
Figure 9B:
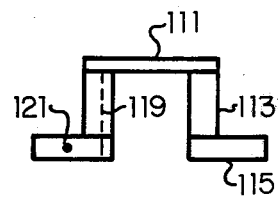

FIGS. 9a and b illustrate top and side views of still another embodiment of a platform according to the present invention which incorporates outwardly skewed pontoons. This embodiment achieves heave response which is reduced in the presence of waves from any direction, e.g., head-on, stern-on, quartering and beam waves. A deck 111 is supported by four columns 113. Attached to each column is a pontoon 115 extending diagonally outwardly in alignment with the diagonal axes 117 of deck 111. The pontoons 115 do not interconnect columns 113. Rather each pontoon is attached to one column and provides a center of dynamic pontoon force 121 which is shifted outwardly of the center-line 119 of its corresponding column. The columns may be disposed vertically or tilted outwardly in alignment with diagonal axes 117. For this platform configuration, the dynamic pontoon forces become more out of phase with respect to a reference at the center of the platform and with respect to each other, and this reduces the total dynamic pontoon forces and improves heave response in the presence of waves from ay direction.

I claim:

1. A semi-submersible floating structure comprising:
   deck means;
   four columns attached to and extending below said deck means near the extremes thereof for submersion in water to provide buoyant supporting force for the structure, each of the columns having an effective center of gravity of displacement;
   pontoon means including a first pontoon attached to a first pair of said columns near the lower ends thereof that are adapted to be submerged and a second pontoon attached to a second pair of columns near the lower ends thereof that are adapted to be submerged, said pontoon means having upper horizontal surface projections which are positioned to remain submerged and having portions which extend longitudinally from the associated column with greater cross-sectional area than the portions thereof between columns.

2. A semi-submersible floating structure as in claim 1 wherein said first and second pontoons are attached to the respective columns is laterally outwardly-shifted relationship to the centers thereof.

* * * * *